United States Patent Office 2,967,123
Patented Jan. 3, 1961

2,967,123
DIALKYL 2,2-DI(O,O-LOWERALKYLPHOSPHORO-DITHIOSUCCINATE)

Sidney B. Richter, Chicago, Ill., assignor to Velsicol Chemical Corporation, Chicago, Ill., a corporation of Illinois No Drawing. Filed Mar. 6, 1959, Ser. No. 797,581

8 Claims. (Cl. 167—22)

This invention relates to new chemical compositions of matter. More specifically, this invention relates to new chemical compounds of the general formula

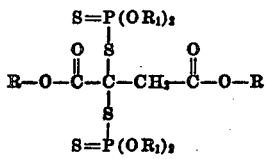

wherein R is the methyl or ethyl radical and $R_1$ is a saturated hydrocarbon radial containing from 1 to 3 carbon atoms. These new compounds, which are the 2:1 addition products of dialkyl phosphorodithioates $$HSP(S)(OR_1)_2$$

wherein $R_1$ is as defined above, with the dimethyl or diethyl esters of acetylenedicarboxylic acid, are useful as pesticides.

The new compounds of this invention can be prepared readily by the reaction of at least two molecular proportions of the dialkyl phosphorodithioate with each molecular proportion of the acetylenedicarboxylate. In practice, it is preferred to use a slight excess of the phosphorodithioate. While the reaction can be carried out without a solvent, relatively inert solvents or diluents such as benzene, toluene, xylene, and the like can be used. It is also preferred to add a small amount of an oxidation inhibitor such as hydroquinone to the reaction mixture. While the reaction temperature is not critical, reaction temperatures in the range from about normal room temperature to about 75° C. (or the reflux temperature of the solvent or diluent, if one is used) are preferred. When the reaction is complete, the reaction mixture is cooled and dissolved in a suitable solvent, provided a solvent has not already been used to run the reaction. The solution is then washed, first with a dilute aqueous solution of a base such as sodium carbonate to remove any excess phosphorodithioate, and then with water. After the solution has been dried over an anhydrous drying agent such as sodium sulfate and filtered, the solvent is distilled off in vacuo. While the product obtained in this manner is often suitable for pesticidal use as such, if desired it can be purified by fractional distillation, crystallization, or other techniques known to those skilled in the art.

The manner in which the compounds of this invention can be prepared is illustrated in the following examples.

EXAMPLE 1
*Preparation of the 2:1 adduct of O,O-dimethyl phosphorodithioate and diethyl acetylenedicarboxylate*

Diethyl acetylenedicarboxylate (17 g.; 0.1 mole) was mixed with 0.1 g. hydroquinone in a 100-ml., round-bottomed flask fitted with a reflux condenser, internal thermometer, and mechanical stirrer. O,O-dimethyl phosphorodithioate (40 g.; 0.25 mole) was then added in portions with stirring. The reaction was mildly exothermic, and the temperature rose to 34° C. within 15 minutes after the addition. External heat was then applied, and the mixture was stirred and heated at temperatures in the range of 38°-71° C. for 27 hours. The mixture was cooled, dissolved in benzene, washed first with 100 ml. of 10% aqueous sodium carbonate solution and then with water, dried over anhydrous sodium sulfate, and filtered through Super-Cel diatomaceous silica filtering aid. The benzene was then distilled off, first under a water aspirator vacuum and finally under a mechanical pump vacuum. The residue was filtered through Super-Cel to give 42.5 g. of diethyl 2,2-di(O,O-dimethylphosphorodithio)succinate, a viscous oil having an index of refraction (D line) at 25° C. of 1.5321.

Analysis for $C_{12}H_{24}O_8P_2S_4$:—Theory: S, 26.38%; P, 12.74%. Found: S, 26.51%; P, 12.73%.

Other new and useful compounds within the scope of this invention can be prepared in the manner detailed above. In the following examples are given the reactants required to prepare the indicated named compounds of this invention. The dimethyl and diethyl esters of acetylene-dicarboxylic acid are referred to as A and B, respectively, for brevity.

EXAMPLE 2
O,O-diethyl phosphorodithioate +B=diethyl 2,2-di(O,O-diethylphosphorodithio)succinate.

EXAMPLE 3
O,O-di-n-propyl phosphorodithioate +B=diethyl 2,2-di(O,O-di-n-propylphosphorodithio)succinate.

EXAMPLE 4
O,O-dimethyl phosphorodithioate +A=dimethyl 2,2-di(O,O-dimethylphosphorodithio)succinate.

EXAMPLE 5
O,O-diethyl phosphorodithioate +A=dimethyl 2,2-di(O,O-diethylphosphorodithio)succinate.

EXAMPLE 6
O,O-di-n-propyl phosphorodithioate +A=dimethyl 2,2-di(O,O-di-n-propylphosphorodithio)succinate.

EXAMPLE 7
O,O,-diisopropyl phosphorodithioate +B=diethyl 2,2-di(O,O-diisopropylphosphorodithio)succinate.

The pesticidal utility of the compounds of this invention was illustrated in a variety of experiments for insecticidal, miticidal, and fungicidal activity. Thus, experiments were carried out for systemic toxicity to the pea aphid (*Macrosiphum pisi*) by root absorption and translocation. Test compounds were dissolved in acetone and dispersed in water at various concentrations. Host plants infested with adult aphids were uprooted, washed free of soil, and placed in glass jars containing 100 cc. of the dispersed test compound. Aluminum foil was placed around the plant stem and jar to reduce possible escape of toxic vapors from the test dispersion. The test plants were maintained in the greenhouse for 72 hours and then observed for systemic aphicidal effectiveness, three replicates being used for each treatment. In these experiments, the product of Example 1 used at a concentration of 100 p.p.m. gave 100% mortality of the aphids with no plant injury, while there was no mortality in an untreated control.

Similar experiments were also carried out for systemic toxicity to the two-spotted spider mite (*Tetranychus bimaculatus*) by root absorption and translocation. Mixed life stages of the mites were used, and the treated host plants were maintained under greenhouse conditions for 7 days before observation. In these experiments, the product of Example 1 gave 100% mortality of the mites with no plant injury at a concentration of 100 p.p.m., while there was only 1.8% mortality in an untreated control.

The toxicity of the compounds of this invention to fungi is surprising and unexpected, since organophosphorus compounds are not generally good fungicides. However, it has been found that the product of Example 1, for example, is toxic to a variety of fungal species. Thus, in experiments carried out by the slide germination technique adopted by the Committee on Standardization of Fungicidal Tests of the American Phytopathological Society, measured concentrations of spores were placed on glass slides in contact with various concentrations of the compounds being tested. The percentage germination of spores was then determined for each treatment after 20 hours' incubation at 72° F. Two replicates were used for each treatment. The results obtained with the product of Example 1 are summarized in the table below.

| Concn., p.p.m. | Organism | Percent Spore Germination | | | ED50,[1] p.p.m. |
| --- | --- | --- | --- | --- | --- |
| | | Rep. 1 | Rep. 2 | Ave. | |
| 100 | *Fusarium roseum* | 2 | 8 | 5 | 50 |
| 100 | *Monilinia fructicola* | 15 | 37 | 26 | 77 |
| 1,000 | do | 0 | 0 | 0 | |

[1] Dosage effective for 50% control.

Experiments were also carried out for the control of bean rust on bean foliage. Pinto bean seedlings, grown under greenhouse conditions, were sprayed with the test compounds at various concentrations for 30 seconds at 30 pounds' pressure. The plants were allowed to dry, inoculated with spore suspensions of the bean rust organism (*Uromyces phaseoli*), and placed in an incubation chamber for 24 to 48 hours. The plants were then removed and maintained under greenhouse conditions for 10 to 14 days, after which the number of rust pustules on the leaves of each plant were then determined. Replicates were run for each test. The results obtained with the product of Example 1 are summarized in the table which follows.

| Concn., p.p.m. | No. Pustules Per Plant | | | | Percent Control | ED95[1] p.p.m. |
| --- | --- | --- | --- | --- | --- | --- |
| | Rep. 1 | Rep. 2 | Total | Ave. | | |
| 100 | 160 | 144 | 304 | 152 | 92 | 155 |
| 1,000 | 14 | 1 | 15 | 7.5 | 99.5 | |
| Untreated Control | 1,701 | 2,261 | | | | |
| Do | 1,975 | | 5,937 | 1,979 | | |

[1] Dosage effective for 95% control.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. Ths surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarly vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 8

*Preparation of an emulsifiable concentrate*

The following ingredients are blended throughly until a homogeneous liquid concentrate is obtained. This concentrate is mixed with water to give an aqueous dispersion containing the desired concentration of active compound for use as a spray.

Diethyl 2,2 - di(O,O-dimethylphosphorodithio)succinate _____ 25
Sodium lauryl sulfate _____ 2
Sodium lignin sulfonate _____ 3
Kerosene _____ 70

EXAMPLE 9

*Preparation of a wettable powder*

The following components are mixed intimately in conventional mixing or blending equipment and are then ground to a powder having an average particle size of less than about 50 microns. The finished powder is dispersed in water to give the desired concentration of active compound.

Diethyl 2,2 - di(O,O-diethylphosphorodithio)succinate _____ 75.00
Fuller's earth _____ 22.75
Sodium lauryl sulfate _____ 2.00
Methyl cellulose _____ .25

EXAMPLE 10

*Preparation of an oil-dispersible powder*

The following components are blended and ground as described in the previous example to give a powder which can be dispersed in oil to form a spray containing the desired concentration of active compound.

| | |
|---|---|
| Diethyl 2,2 - di(O,O-di-n-propylphosphorodithio)succinate | 70 |
| Condensation product of diamylphenol with ethylene oxide | 4 |
| Fuller's earth | 26 |

EXAMPLE 11

*Preparation of a dust*

The following ingredients are mixed thoroughly and then ground to an average particle size of less than about 50 microns to give a dust suitable for application with conventional dusting equipment.

| | |
|---|---|
| Dimethyl 2,2-di(O,O-dimethylphosphorodithio)succinate | 20 |
| Talc | 80 |

EXAMPLE 12

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| Dimethyl 2,2 - di(O,O-diethylphosphorodithio)succinate | 10 |
| Fuller's earth | 66 |
| Dextrin | 20 |
| Sodium lignin sulfonate | 3 |
| Kerosene | 1 |

I claim:

1. A compound of the formula

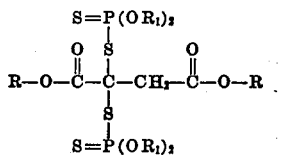

wherein R is selected from the group consisting of methyl and ethyl radicals, and $R_1$ is an alkyl radical containing from 1 to 3 carbon atoms.

2. Diethyl 2,2 - di(O,O-dimethylphosphorodithio)-succinate.

3. Diethyl 2,2 - di(O,O-diethylphosphorodithio)succinate.

4. Diethyl 2,2 - di(O,O-di-n-propylphosphorodithio)-succinate.

5. Dimethyl 2,2 - di(O,O-dimethylphosphorodithio)-succinate.

6. Dimethyl 2,2 - di(O,O-diethylphosphorodithio)succinate.

7. An insecticidal and miticidal composition comprising an inert carrier and a toxic amount of a compound of claim 1.

8. A method of destroying undesirable insects and mites which comprises contacting these pests with an insecticidal and miticidal composition comprising an inert carrier and a compound of claim 1 as the essential active ingredient in a quantity which is toxic to said pests.

No references cited.

UNITED STATES PATENT OFFICE
CERTIFICATION OF CORRECTION

Patent No. 2,967,123

January 3, 1961

Sidney B. Richter

It is hereby certified that error appears in the above numbered patent requiring correction and that the said Letters Patent should read as corrected below.

In the heading to the printed specification, lines 2 and 3, the title should appear as shown below instead of as in the patent:

DIALKYL 2,2-DI(O,O-LOWERALKYLPHOSPHORODITHIO)-SUCCINATE column 1, line 26, for "radial" read -- radical --.

Signed and sealed this 20th day of June 1961.

(SEAL)
Attest:

ERNEST W. SWIDER
Attesting Officer

DAVID L. LADD
Commissioner of Patents